Patented Nov. 26, 1940

2,222,763

UNITED STATES PATENT OFFICE 2,222,763

MONOAZO DYESTUFFS INSOLUBLE IN WATER

Ernst Fischer, Offenbach-on-the-Main, Germany, assignor to General Aniline & Film Corporation, a corporation of Delaware No Drawing. Application June 24, 1939, Serial No. 280,973. In Germany June 25, 1938

5 Claims. (Cl. 260—152)

The present invention relates to monoazo-dyestuffs insoluble in water; more particularly, it relates to dyestuffs of the following general formula:

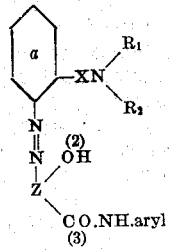

wherein the benzene radical $a$ may be further substituted by alkyl-, alkoxy-, aryloxy-groups or halogen, X means the group —CO— or —SO$_2$—, R$_1$ and R$_2$ being alkyl-, aralkyl-, aryl- or hydro-aromatic radicals which may be connected in a heterocyclic ring system, with the proviso that if X stands for SO$_2$, R$_1$ and R$_2$ may only be simultaneously alkyl radicals, if the sum of their carbon atoms be at least 5, and Z stands for a carbazole, diphenylene oxide or diphenylene sulfide radical.

I have found that valuable pigment dyestuffs may be obtained by coupling the diazo-compound from an amine of the general formula:

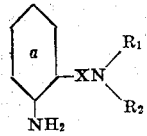

wherein the benzene radical $a$ may be further substituted by alkyl-, alkoxy-, aryloxy-groups or halogen, X means the group —CO— or —SO$_2$—, R$_1$ and R$_2$ being alkyl-, aralkyl-aryl- or hydro-aromatic radicals which may be connected in a heterocyclic ring system, with the proviso that if X stands for SO$_2$, R$_1$ and R$_2$ may only be simultaneously alkyl radicals, if the sum of their carbon atoms be at least 5, with an arylide of 2-hydroxycarbazole-3-carboxylic acid, 3-hydroxydiphenylene oxide-2-carboxylic acid or 3-hydroxydiphenylene sulfide-2-carboxylic acid, only such dyestuff components being used as do not contain any group lending solubility in water, such as the sulfonic or carboxylic acid group.

The new dyestuffs yield generally brown tints which, depending upon the kind of the diazo-compound used, extend to black-brown and have good properties of fastness. They are insoluble in water, but very easily soluble in many organic solvents, for instance, hydrocarbons, alcohols, esters, ketones and can be used for coloring these solvents as well as the lacquers prepared by means of these solvents, such as nitro- or acetyl-cellulose lacquers, films or plastic masses. They are also very suitable for coloring varnishes, candles and fats.

In comparison with the dyestuffs described in German Patents Nos. 551,880, 594,326 and 596,753, the dyestuffs obtainable by this invention are distinguished by their enhanced solubility in organic solvents so that they are very suitable for coloring these solvents as well as the lacquers prepared by means of these solvents, such as nitro- or acetyl-cellulose lacquers, films or artificial masses, and also for coloring varnishes, candles and fats whereas the dyestuffs of the above-named German patents have either no solubility in organic solvents or a solubility too small for these purposes.

The following examples serve to illustrate the invention, but they are not intended to limit it thereto; the parts are by weight:

1. 9.6 parts of 1-aminobenzene-2-(carbonyl-diethylamine) are diazotized in the usual manner. In order to bind the excess of mineral acid sodium acetate is added to the diazo-solution and the whole is stirred into a solution of 15.1 parts of 2-hydroxycarbazole-3-(carbonyl-amino-benzene) in dilute caustic soda solution. When the coupling is finished the dyestuff formed is filtered with suction, washed well and dried. It is a brown powder which dissolves easily in butyl acetate, acetone, xylene and other organic solvents and colors cellulose ester lacquers brown tints of good properties of fastness.

The dyestuff corresponds with the following formula:

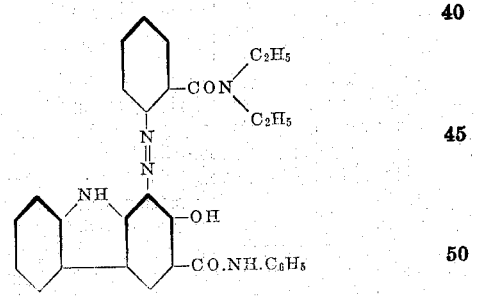

2. 10.2 parts of 1-aminobenzene-2-(carbonyl-N-piperidine) are diazotized in the usual manner. The diazo-solution is made neutral to Congo paper by means of sodium acetate and then introduced, while stirring, into a solution of 16.6 parts of 2-hydroxycarbazole-3-(carbonyl-1'-amino-4'-methoxybenzene) in dilute caustic soda solution. The dyestuff formed is filtered with suction, washed well and dried. It dissolves easily in butyl alcohol, xylene and other organic solvents and colors nitrocellulose and acetylcellulose lacquers as well as varnishes brown tints of good fastness to light.

3. By using in Example 1 instead of 15.1 parts of 2-hydroxycarbazole-3 - (carbonyl - aminobenzene), 18.2 parts of 3-hydroxydiphenylene oxide-2-(carbonyl-1'-amino-2',5' - dimethoxybenzene), a dyestuff of similarly good properties of fastness is obtained which colors the various organic solvents and the lacquers prepared therewith, and also candles and fats, brown tints.

4. From the diazo-compound of 15.9 parts of 1-aminobenzene - 2- (sulfonyl-N-(n)-butyl-1'-amino-2'-methylbenzene) and 17.6 parts of 2-hydroxycarbazole-3-(carbonyl - 2' - aminonaphthalene) there is obtained, in the manner described in Examples 1 and 2, a brown pigment dyestuff which is easily soluble in organic solvents and colors artificial masses and lacquers prepared therewith, also candles and fats, yellowish-brown tints of good fastness to light.

The following table illustrates a number of other mono-azo-dyestuffs obtainable by this invention, which are likewise easily soluble in the solvents usually applied for these purposes and have good properties of fastness:

I claim:

1. The water-insoluble mono-azo-dyestuffs of the following general formula:

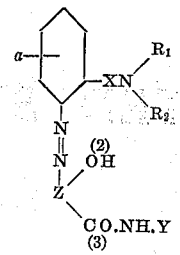

wherein $a$ stands for a member of the group consisting of hydrogen, alkyl, alkoxy, phenoxy and halogen, X means one of the groups —CO— and —$SO_2$—, $R_1$ and $R_2$ stand for members of the group consisting of alkyl, benzyl, radicals of the benzene and naphthalene series and hydroaromatic radicals which may be connected in a heterocyclic ring system, with the proviso that if X stands for $SO_2$, $R_1$ and $R_2$ may only be simultaneously alkyl radicals if the sum of their carbon atoms be at least 5, Z stands for a radical of the group consisting of carbazole, diphenylene oxide and diphenylene sulfide and Y stands for a member of the group consisting of radicals of the benzene and naphthalene series, being insoluble in water, but very easily soluble in organic solvents and yielding generally brown tints of good properties of fastness.

| | Diazo-compound from— | Coupled with— | Shade |
|---|---|---|---|
| 1 | 1-aminobenzene-2-(carbonyl-N-ethyl-cyclohexylamine). | 2-hydroxycarbazole-3-(carbonyl--1'-amino-2',4'di-methoxybenzene). | Brown. |
| 2 | 1-aminobenzene-2-(carbonyl-diethyl-amine). | -1'-amino-4'-chlorobenzene). | Do. |
| 3 | 1-aminobenzene-2-(sulfonyl-n-dibutyl-amine). | -aminobenzene). | Do. |
| 4 | 1-aminobenzene-2-(carbonyl-dibenzyl-amine). | -aminobenzene). | Do. |
| 5 | 1-aminobenzene-2-(sulfonyl-n-dibutyl-amine). | -1'-amino-4'-chlorobenzene. | Do. |
| 6 | 1-aminobenzene-2-(carbonyl-diethyl-amine). | 3 - hydroxydiphenylene - sulfide - 2 - (carbonyl-aminobenzene). | Do. |
| 7 | 1-aminobenzene-2-(sulfonyl-N-(n)-butyl-1'-amino-2'-methylbenzene). | 3-hydroxydiphenylene-oxide-2-(carbonyl-aminobenzene). | Do. |
| 8 | 1-aminobenzene-2-(sulfonyl-N-benzyl-cyclohexylamine). | 2-hydroxycarbazole-3-(carbonyl--aminobenzene). | Do. |
| 9 | 1-amino-3-methylbenzene-6-(carbonyl-dimethylamine). | -aminobenzene). | Do. |
| 10 | 1-amino-3-methylbenzene-6-(carbonyl-N-benzyl-phenylamine). | -aminobenzene). | Do. |
| 11 | 1-amino-3-methylbenzene-6-(carbonyl-dicyclohexylamine). | -1'-amino-2',4'-dimethoyxbenzene. | Do. |
| 12 | 1-amino-3-methylbenzene-6-(carbonyl-diphenylamine). | -1'-amino-2',5'-dimethoxybenzene). | Do. |
| 13 | 1-amino-4-chlorobenzene-6-(carbonyl-N-phenyl-2'-naphthylamine). | -1'-amino-2',5'-dimethoxybenzene). | Do. |
| 14 | 1-amino-4-chlorobenzene-6-(carbonyl-N-carbazole). | -aminobenzene). | Do. |
| 15 | 1-amino-4-phenoxybenzene-6-(carbonyl-N-methyl-benzylamine). | -aminobenzene). | Do. |
| 16 | 1-amino-4-methoxybenzene-6-(sulfonyl-n-dibutylamine). | -1'-amino-4'-chlorobenzene). | Do. |
| 17 | 1-amino-4-ethoxybenzene-6-(sulfonyl-n-dibutylamine) | -2'-aminonaphthalene). | Do. |
| 18 | 1-amino-3-methylbenzene-6-(carbonyl-n-dibutylamine). | -1'-amino-4'-chlorobenzene). | Do. |
| 19 | 1-amino-3-methoxybenzene-6-(carbonyl-diethylamine) | -aminobenzene). | Do. |
| 20 | 1-amino-4-methoxybenzene-6-(sulfonyl-n-dibutylamine). | -1'-amino-3'-(diethyl-amino-carbonyl-benzene). | Do. |
| 21 | Do. | -1'-amino-2'-(phenylsulfonyl-benzene). | Do. |
| 22 | 1-amino-3-methoxybenzene-6-(carbonyl-diethylamine). | -1'-amino-3'-(n - dibutylaminosulfonyl-benzene). | Do. |
| 23 | 1-amino-4-ethoxybenzene-6-(sulfonyl-n-dibutylamine) | 9-methyl-2-hydroxycarbazole-3-(carbonyl-1'-amino-2'-methyl-4'-methoxybenzene). | Do. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

2. The water-insoluble mono-azo-dyestuffs of the following general formula:

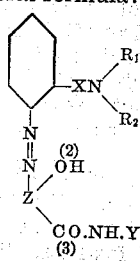

wherein X means one of the groups —CO— and —SO₂—, R₁ and R₂ stand for members of the group consisting of alkyl, benzyl, radicals of the benzene and naphthalene series and hydroaromatic radicals which may be connected in a heterocyclic ring system, with the proviso that if X stands for SO₂, R₁ and R₂ may only be simultaneously alkyl radicals if the sum of their carbon atoms be at least 5, Z stands for a radical of the group consisting of carbazole, diphenylene oxide and diphenylene sulfide and Y stands for a radical of the benzene series, being insoluble in water, but very easily soluble in organic solvents and yielding generally brown tints of good properties of fastness.

3. The water-insoluble mono-azo-dyestuff of the following formula:

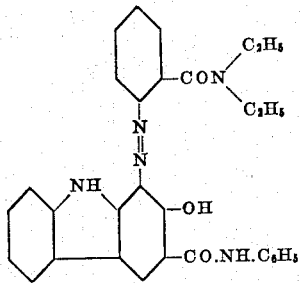

being insoluble in water, but very easily soluble in organic solvents and yielding brown tints of good properties of fastness.

4. The water-insoluble mono-azo-dyestuff of the following formula:

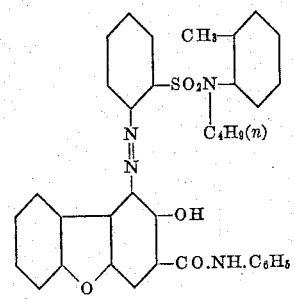

being insoluble in water, but very easily soluble in organic solvents and yielding brown tints of good properties of fastness.

5. The water-insoluble mono-azo-dyestuff of the following formula:

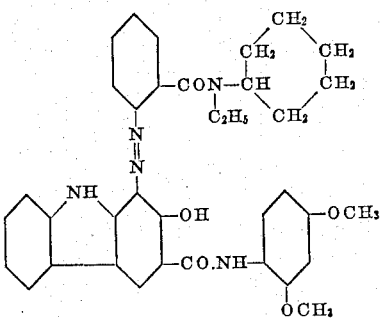

being insoluble in water, but very easily soluble in organic solvents and yielding brown tints of good properties of fastness.

ERNST FISCHER.